Oct. 18, 1932.     J. B. WHITTED     1,883,206
HYDRAULIC SHOCK ABSORBER
Filed Aug. 2, 1928
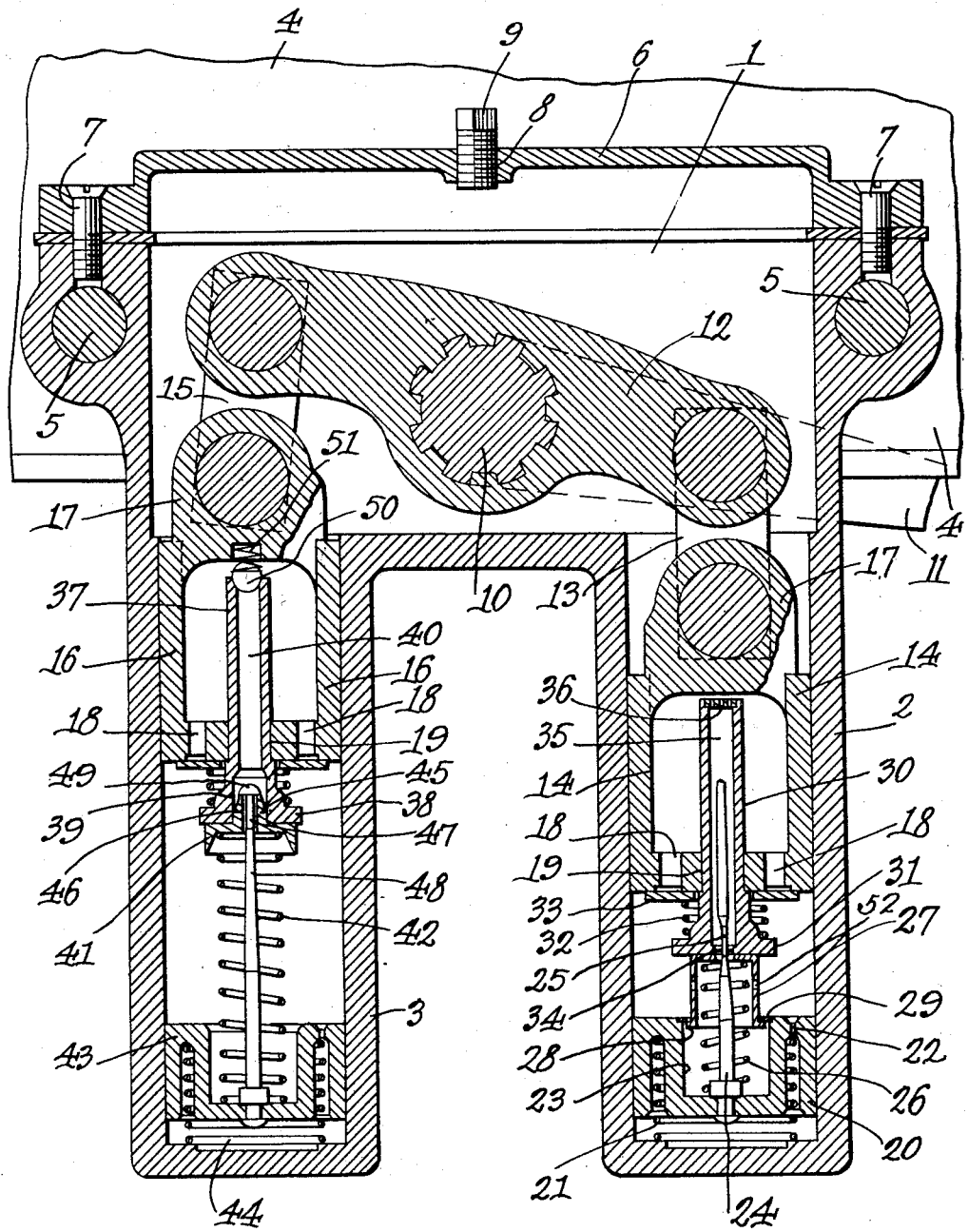
John B. Whitted, Inventor
By C. A. Snow & Co.
Attorneys Patented Oct. 18, 1932

1,883,206

UNITED STATES PATENT OFFICE

JOHN B. WHITTED, OF HAGERSTOWN, MARYLAND, ASSIGNOR TO STEWART-WARNER CORPORATION, OF CHICAGO, ILLINOIS, A CORPORATION OF VIRGINIA

HYDRAULIC SHOCK ABSORBER

Application filed August 2, 1928. Serial No. 297,040.

This invention relates to hydraulic shock absorbers and is, more especially, an improvement upon the structure disclosed in my application filed April 3, 1928, Serial Number 267,038.

It has been found that, in structures of this type, the fluids used, especially oils of low viscosity, tend to produce objectionable screaming noises during the flow of the fluids through restricted openings provided therefor and while the fluids are under considerable pressure.

It is an object of the invention to provide simple and efficient means which can be utilized in connection with a structure such as disclosed in my application mentioned and will act efficiently to eliminate objectionable noises, the said means acting to subject the fluid while it passes from a point of high pressure to a point of no pressure, to an intermediate stage of compression.

With the foregoing and other objects in view which will appear as the description proceeds the invention resides in the combination and arrangement of parts and in the details of construction hereinafter described and claimed it being understood that changes in the precise embodiment of the invention herein disclosed may be made within the scope of what is claimed without departing from the spirit of the invention.

In the accompanying drawing, which is a section through a shock absorber having the present improvements, the preferred form of the invention has been shown.

Referring to the drawing by characters of reference 1 designates the body of the structure constituting a reservoir, this body, in the structure illustrated, being provided with two depending cylinders 2 and 3 opening at one end thereinto. The body 1 is adapted to be fastened to the chassis 4 of a motor vehicle or the like by means of bolts 5 and may be formed with a cap 6 held removably in position by screws 7 or other suitable fastening means. A feed opening 8 is formed in the cap whereby the reservoir can be partly or entirely filled with oil or other fluid, this opening being normally closed by a screw plug 9 or the like.

A shaft 10 extends transversely through the body 1 and projects therebeyond, there being an arm 11 securely fastened to the projecting end of the shaft and adapted to be attached by a link or the like, not shown, to a vehicle spring. It is to be understood of course, that this arrangement can be reversed, if preferred, the body 1 being attached to a spring or axle and the arm 11 being connected to the chassis.

A crosshead 12 is connected, at its center, to the shaft 10 and is mounted for oscillation within the reservoir in the body. One end of this crosshead is connected by links 13 to a piston 14 mounted for reciprocation in the cylinder 2 and the other end of the crosshead is connected by links 15 to a piston 16 mounted for reciprocation within the cylinder 3. Both pistons are hollow and open at their tops, said open ends being bridged by ears 17 to which the links are connected. The lower ends of the pistons are formed with orifices 18 for the flow of fluid and with central openings 19.

Movably mounted in the cylinder 2 between the closed end thereof and the piston 14 is a load compensating piston 20 yieldingly supported by a coiled spring 21 and having one or more small apertures 22 whereby fluid can flow slowly from one side to the other of the piston 20. This compensating piston has a concentric recess 23 containing one end portion of an elongated valve pin 24 which is secured to the middle portion of piston 20 and extended upwardly therefrom through the opening 19.

That portion of the pin 24 in the recess is preferably cylindrical and from this cylindrical portion the pin is gradually tapered toward its free end. At an intermediate point the tapered portion is reduced annularly as shown at 25. A spring 26 is seated in the recess 23 and extends around the pin, this spring projecting into and yieldingly supporting an apertured cap 27 the open base of which has an annular flange 28 over which extends a retaining ring 29 fixedly seated in the upper end of recess 23. The aperture in the upper end of the cap 27 permits passage of the valve pin 24 and is equal in size to the restricted opening 34 in the head 31 of the tubular stem 30. The sides of the cap 27 are provided with a plurality of openings 52 to permit passage of fluid into and out of the cap.

The structure thus far described is similar to that disclosed in my application heretofore referred to. One of the improvements consists of a tubular stem 30 fixedly mounted between its ends in the aperture 19 and provided, at its lower end, with an annular enlargement or head 31 which supports a spring 32. This spring thrusts against a valve ring 33 and holds it normally in position to close the orifices 18. Head 31 bears against the cap 27 and has a restricted opening 34 located at the lower end of a passage 35 which extends longitudinally through the stem 30. Normally the restriction 34 extends around the reduced portion 25 of the valve pin 24. The passage 35 has its upper end partly closed by an apertured disk 36. The combined area of the apertures should be equal to or slightly less than the area of the space between restriction 34 and the pin valve.

Where the shock absorber has two cooperating units as shown in the drawing the piston 16 may be formed with a tubular stem 37 fitted tightly in the opening 19 and provided at its lower end with a head 38 formed with an enlarged opening 39 at the lower end of the passage 40 in the stem. A cap 41 may be held against the head 38 by a spring 42 seated in the load compensating piston 43 which is yieldingly supported by a spring 44. A nipple 45 may be extended from the cap into the enlarged end 39 of passage 40, this nipple being provided with an opening 46 producing a restriction in the head 38. In this restriction is normally seated the reduced end 47 of a tapered valve pin 48 carried by the compensating piston 43. A head 49 may be formed at the free end of the pin as shown.

The upper end of the passage 40, in the structure illustrated, is normally closed by a ball valve 50 held yieldingly to its seat by a spring 51. It is intended that, when this valve is in full open position the area of the space thus provided will be equal to or slightly more than the area of the space within the nipple 45 and surrounding the reduced portion 47.

The operation of the device is, in all essentials, the same as that of the structure disclosed in my application heretofore mentioned. Relative movement of the chassis and axle will result in movement of the pistons in their cylinders. During the downward stroke of piston 14 the orifices 18 are closed by valve 33 and fluid in the path of the piston can only be displaced by flowing along the valve pin 24 through restriction 34 into passage 35. During the downward stroke of piston 16 the action of the fluid is practically the same as that in cylinder 2. Heretofore this flow of fluid under heavy pressure through the restrictions into the pistons and reservoir where there is no pressure, has produced an objectionable screaming. It has been found, however, that by utilizing an intermediate chamber between the area of high pressure and the area of no pressure, this intermediate chamber having a means for building up an intermediate pressure, all objectionable sounds are eliminated. This intermediate pressure can only be produced by slightly retarding the flow of the fluid upwardly from the tubular stems as the pistons are making their compression strokes and in practice it has been found necessary to reduce the outlets of the tubular stems so that the areas thereof are substantially equal to the greatest areas of the spaces through which the fluid flows from the high pressure sides of the pistons to the no pressure sides.

Although a ball valve has been shown in connection with one of the tubular stems it is to be understood that any kind of a valve can be used with either or both stems or, if preferred, both stems can be restricted by means of an apertured disk. Under any of these conditions the operation would be the same as described. Furthermore, while the improvements have been disclosed in connection with a shock absorber having two cooperating units, the construction shown at the right of the drawing might be used alone, the left hand cylinder 3 being eliminated entirely. This would afford a single acting rebound snubber of the type shown in my application heretofore referred to. The construction shown is to be understood as illustrative only as I contemplate such changes and modifications as come within the spirit and scope of the appended claims.

What is claimed is:

1. A hydraulic shock absorber including a cylinder, a valved piston therein having a high pressure side and a no pressure side, there being an opening through the piston for the flow of fluid displaced from the high pressure side by the piston, means for controlling flow through said piston opening and means carried by the piston and opening into the no pressure side for building up an intermediate pressure of displaced fluid while flowing to the no pressure side.

2. A hydraulic shock absorber including a cylinder, a piston movably mounted therein having a high pressure side and a no pressure side, there being a valve opening in the piston for the flow of fluid from the no pressure side to the high pressure side and an opening in the piston for the flow of displaced fluid from the high pressure side back to the no pressure side, means for regulating flow through said last named opening, and means carried by the piston for building up an intermediate pressure of the displaced fluid beyond the regulated opening.

3. A hydraulic shock absorber including a cylinder, a piston movably mounted therein having a high pressure side and a no pressure side, there being a valve opening in the piston for the flow of fluid from the no pressure side to the high pressure side and an opening in the piston for the flow of displaced fluid from the high pressure side back to the no pressure side, a pin valve of varying diameters mounted within the cylinder and projecting through the piston opening to control the amount of displaced fluid passing from the high pressure side of the piston to the no pressure side, and means carried by the piston for building up a pressure against the stream of displaced fluid flowing through said opening to the no pressure side.

4. A hydraulic shock absorber including a cylinder, a piston therein having an opening, a pin valve extending into the opening for controlling the amount of fluid displaced through the opening by the piston on its compression stroke, and means carried by the piston beyond the opening for building up a resistance against the stream of fluid while being displaced through the opening.

5. A hydraulic shock absorber including a cylinder, a piston therein having an opening, a pin valve extending into the opening for controlling the amount of fluid displaced through the opening by the piston on its compression stroke, and means carried by the piston beyond the opening for setting up an intermediate stage of compression of fluid while being displaced through the opening in the piston during compression of the fluid by the piston.

6. A hydraulic shock absorber including a cylinder, a piston therein having an opening, a pin valve extending into the opening for controlling the amount of fluid displaced through the opening by the piston on its compression stroke, and means carried by the piston for setting up an intermediate stage of compression of fluid while being displaced through the opening in the piston during compression of the fluid by the piston, said means including an intermediate compression chamber beyond the opening having an outlet the area of which is not less than the greatest area of the space through which displaced fluid flows to said chamber.

In testimony that I claim the foregoing as my own, I have hereto affixed my signature.

JOHN B. WHITTED.